United States Patent [19]

Carew

[11] Patent Number: 5,292,792

[45] Date of Patent: * Mar. 8, 1994

[54] CONDUCTIVE POLYMERS

[76] Inventor: Evan B. Carew, 23131 Lodge La., Dearborn, Mich. 48124

[*] Notice: The portion of the term of this patent subsequent to Apr. 25, 2006 has been disclaimed.

[21] Appl. No.: 871,338

[22] Filed: Apr. 21, 1992

Related U.S. Application Data

[63] Continuation of Ser. No. 529,958, May 29, 1990, Pat. No. 5,130,380.

[51] Int. Cl.$^5$ .............................................. C08F 8/00
[52] U.S. Cl. .............................. 524/550; 525/328.1; 252/511
[58] Field of Search ........................ 524/550; 252/511

[56] References Cited

U.S. PATENT DOCUMENTS

| | | | |
|---|---|---|---|
| 3,886,612 | 5/1975 | Furukawa et al. | 525/328.1 |
| 4,404,126 | 9/1983 | Muench et al. | 526/285 |
| 4,678,842 | 7/1987 | Sandler | 525/359.1 |
| 4,834,911 | 5/1989 | Carew | 252/500 |

FOREIGN PATENT DOCUMENTS

| | | | |
|---|---|---|---|
| 58-34807 | 3/1983 | Japan | 525/328.1 |
| 59-133216 | 7/1984 | Japan | 252/500 |

OTHER PUBLICATIONS

Shirakawa, et al., "Synthesis of Electrically Conducting Organic Polymers: Halogen Derivatives of Polyacetylene, $(CH)_x$", J. Chem. Soc, Chem. Commun. 1977, (16) 578-80.

*Primary Examiner*—Bernard Lipman
*Attorney, Agent, or Firm*—Dykema Gossett

[57] ABSTRACT

Intrinsically conductive or semiconductive stable polyacetylides and methods of forming same. The unique soluble metallic polyacetylides may be formed as a conductive adherent film for coating glass, ceramics and metals. The polyacetylides may also be synthesized with pendant organic anions and cations for conductive or semiconductive materials, including integrated circuit subunits, printed circuit board equivalents and thin film electrodes in an organic battery. The polyacetylides may also be synthesized with organic crosslinkers forming high tensile strength polymers comparable to steel. A simultaneous polymerization initiation for forming the conductive polymers is also disclosed by which catalyst/reductant initiation and non-chemical initiation are used to initiate polymerization.

1 Claim, 2 Drawing Sheets

CONDUCTIVE POLYMERS

This is a continuation of copending application Ser. No. 07/529,958 filed on May 29, 1990 U.S. Pat. No. 5,130,380.

FIELD OF THE INVENTION

The present invention relates to soluble intrinsically conductive or semiconductive stable polyacetylides and methods of forming such polyacetylides. The polyacetylides of this invention may be formed as conductive films or synthesized with pendant organic anions and cations for use as semiconductive materials or organic crosslinkers, forming high tensile strength resins.

DESCRIPTION OF THE PRIOR ART

Organic polymers and compounds are most generally electrical insulators, although the prior art does include organic compounds in the metallic state. Electrical conductivity among organics applies to charge-transfer complexes and polymeric hydrocarbons having cooperative pi-electron structures. Attempts to synthesize organic compounds with conductivities in the metallic range have been successful, at least in the laboratory, although such materials have been stable only in charge-transfer complexes, such as tetracylano-p-quinodimethane and tetrathiofulvalene. Tetrathiofulvalene-tetracylano-p-quinodimethane, however, forms as fragile crystals with relatively limited potential industrial applications.

Polyacetylene (CH)x has recognized potential usefulness for industrial applications because certain doped composition reach metallic conductivities on the order of 500 ohms$^{-1}$ centimeters$^{-1}$ while retaining some fabrication flexibility. Recent studies report that stretched $CH_x$ filous exhibit after doping a long axis d.c. conductivity as high as $1.5 \times 10^5$ ohms$^{-1}$ centimeters$^{-1}$. Polyacetylene, however, remains limited in its usefulness as commonly synthesized with the Ziegler-Natta catalyst because it is formed as a freestanding film which is relatively inflexible, insoluble, somewhat fragile, and electrically unstable in normal atmospheres. Polyacetylene synthesized from Ziegler-Natta catalyst forms a thin film on the side of the reaction vessel and has a density of between 0.2 and 0.02. The thin film is composed of 20 nm fibrils which have aggregated from 3 nm microfilaments. The strength of such a film relies on weak hydrophobic bonds which are on the order of $1 \times 10^{-3}$ those of the covalent linkage and 1-10th of the hydrogen bond which crosslinks the nylons, for example. Thus, polyacetylene synthesized with Ziegler-Natta catalyst, is not at this time a commercially useful polymer.

Laboratory attempts to correct these deficiencies have involved encasing the polyacetylene film in plastic or glass and blending the polyacetylene with other soluble plastics. Alternative methods of synthesis utilize complex and expensive starting materials. It has also been proposed to synthesize polyacetylene from non-bulk Merrifield-type methods. Polyacetylene produced by these methods, however, has not been used commercially because (1) the complex and expensive starting materials limit the usefulness of the newer procedures, (2) stability remains a problem and (3) none of the polyacetylenes are soluble or intrinsically conductive.

Similarly, polyacetylene has not been modified by conventional polymer addition reactions because it has not been available in a soluble form, as necessary for such reactions. Structural polymers have been modified by replacement, addition or alteration of branching groups attached to the chain backbone. The prior art has not been successful in attaching pendant or branching groups to polyacetylene because of its insolubility. As described herein, the applicant has been successful in synthesizing soluble, intrinsically conductive, stable polyacetylides which opens new fields of polymer chemistry.

SUMMARY OF THE INVENTION

The present invention relates to unique soluble intrinsically conductive and stable polyacetylides, methods of forming such polyacetylides and unique applications for such polyacetylides.

One method of forming polyacetylides of this invention, sometimes referred to as the end product modification method, comprises first forming polyacetylene from acetylene gas in the presence of a catalyst, preferably cobalt nitrate and a reductant, such as sodium borohydride. In the most preferred end product modification method, the catalyst and reductant are each dissolved in a solvent and saturated separately with acetylene gas. The solutions are then combined and mixed, precipitating polyacetylene. Dehydrobromination is then performed on the polyacetylene to produce bromopolyacetylide by contacting the polyacetylene with bromine gas in a solubilizing medium, such as acetone/petroleum ether. Iodopolyacetylides and chloropolyacetylides may be formed by the same process.

The polyacetylene chain formed by the method described above may now be modified by metallization. For example, sodium or lithium may be substituted for the bromine in the bromoacetylene chain by stirring the bromoacetylene in a suitable solvent in the presence of sodium or lithium sand. This method is generally applicable for the preparation of any metallic polyacetylide. The replacement of bromine with other elements having metallic properties will also proceed quantitatively, though at a slower rate. The end product modification methods of forming polyacetylides may be performed in a batch-type process or a continuous process wherein the halogenation, metallization and polymer branching can be accomplished in solution.

The methods of this invention also include a substituted monomer method wherein haloacetylides, preferably iodoacetylide or lithium acetylide, may be polymerized directly into their respective polyacetylides in the presence of a catalyst and reductant. This direct method has the advantage of insuring that halogens and metal are distributed uniformly within the final product and the polyacetylides are soluble in polar solvents, such as water and alcohol. The polyacetylides formed by the end product modification methods are stable and soluble in polar solvents.

As described, the soluble stable intrinsically conductive and semiconductive polyacetylides formed by the methods of this invention are unique and may be utilized, for example, to form thin stable films which adhere strongly to glass, ceramics and metals having very useful properties. For example, the intrinsically conductive polyacetylides may be used directly as a glass coating forming a sunscreen and glass heater. The soluble polyacetylides may also be used as starting materials in various polymer reactions, opening a new field of polymer chemistry.

The above-described soluble metallic polyacetylides of this invention may be modified by attaching pendant or branching groups directly to the polyacetylide chain. As described, the prior art methods of attaching pendant or branching groups to conductive polymers in general and polyacetylene in particular have not been commercially successful. It has been discovered that the sodium salt of polyacetylide formed by the method of this invention is particularly useful because sodium is an excellent leaving group. Thus, the metallic polyacetylides in this invention may be synthesized with pendant organic anions and cations for use as conductive or semiconductive materials including integrated circuits, printed circuit board equivalents and thin film electrodes in an organic storage battery. Bromine and other halogen derivatives of aromatic compounds react strongly with sodium, proceeding quantitatively to sodium bromide elimination and replacement with benzyl and like aromatic derivatives. The addition of bromobenzyl and fluorobenzyl derivatives, for example, leave the ring cationic, thus withdrawing electrons from the polyacetylide chain, leaving it p-type. Similarly, the addition of bromo-pyrimidine produces an anionic pendant group, which donates electrons to the polyacetylide, leaving it n-type. Thus, it is possible to form completely organic n- and p- semiconductive polymers which may be "tuned" to desirable characteristics for many different applications including switches, photodiodes, laser diodes, microwave detection, temperature and pressure sensors, magnetic field sensors, molecular memory devices, capacitors, resistors, transistors, etc. Because the polyacetylides of this invention are soluble, the metallic, semiconductive and resistive polyacetylides may also be utilized as inks, forming integrated circuit and printed circuit components. In addition, since the polymer length corresponds to product color, inks of different color may be synthesized by stopping the reaction at the appropriate chain length.

Finally, the polyacetylides of this invention may be synthesized with organic crosslinkers, forming very high tensile strength polymers. For example, sodium polyacetylide formed by the method described above may be combined with bromothiobenzene. The reaction proceeds at ambient temperature and atmospheric pressure to the removal of sodium bromide and addition of thiobenzene to the polyacetylide chain. The reaction product is then oxidized and adjacent chains with the nearest neighbor thiol groups lose their hydrogen and react with one another forming dithiols (disulfides) improving the tensile strength by $10^3$ and providing elasticity due to the deformable dihedral angle about the bond. It has been discovered that the sulfur addition by this method does not interfere with the conductivity of the polyacetylide. Instead, the conductivity is enhanced presumably by facilitating interchain charge transfer. Thus, the resultant polyacetylide may be used, for example, as super hard coatings on glass and metallic surfaces and for structural materials used by the transportation and building industries.

A more preferred method of crosslinking polyacetylides of this invention comprises polymerizing a polyacetylene having iodine and/or lithium as pendant groups, then crosslinking the products with monomers having sodium, lithium or iodine constituents. The monomers may include sulfur, acetylene and ethylene. If ethylene is the monomer, any halogen may be used. It is also possible to incorporate Grignard-type monomers by this method, whereby other metals including aluminum, copper, iron, germanium, etc. may be incorporated intrinsically in the polyacetylide chain.

In still another aspect, the present invention provides a method of forming a conductive polymer by polmerizing acetylene simultaneously through catalyst/reductant initiation and photochemical or ionizing radiation initiation. The method includes the steps of flowing acetylene gas through a solution containing a catalyst and reductant while simultaneously exposing the reactant system to visible or ultraviolet light. Alternatively, the reactant system may be simultaneously irradiated by ionizing radiative such as x-rays, gamma rays or particulate radiation such as neutrons, alpha particles, and beta particles.

In summary, the methods of this invention produce unique intrinsically conductive or semiconductive stable polyacetylides which have numerous applications as described more fully in the following detailed description of the preferred methods and embodiments of the invention, the appended claims and the drawings, a brief description of which follows.

DETAILED DESCRIPTION OF THE PREFERRED EMBODIMENTS AND METHODS OF THIS INVENTION

As described above, the unique soluble intrinsically conductive or semiconductive stable polyacetylides of this invention open a new field of polymer chemistry. The polyacetylides of this invention may be used directly as stable conductive films, including vaporless paints, or crosslinked and formed into structural components, or used as conductive or semiconductive electrical elements, including batteries, switches, sensors, resistors, etc.

The preferred methods of forming the basic polyacetylides of this invention include end product modification and monomer substitution. Two end product modification methods are disclosed herein, including a batch-type method and a method which may be performed continuously in solution. In either end product modification method, acetylene gas is reacted in the presence of a catalyst and reductant at dry ice temperatures ($-60°$ C.), forming soluble stable polyacetylene. The polyacetylene is then brominated. The pendant bromine atoms are then replaced by an alkali metal, preferably sodium or lithium. As described below, the soluble stable polyacetylide may then be used directly or modified further. In the preferred batch-type and product modification method, the catalyst and reductant are separately saturated in solution with acetylene gas. The preferred catalyst is cobalt nitrate $CO(NO_3)_2$ and the preferred reductant is sodium borohydride, $NaBH_4$ (Luttinger catalyst). In a typical application, the catalyst and reductant are dissolved in 50/50 petroleum ether/acetone at 20 mM concentrations. Each solution is then saturated with acetylene gas at dry ice—acetone temperatures ($-60°$ C. or $193°$ K.). The saturated so- dium borohydride solution is then decanted into the cobalt nitrate solution and the contents are mixed by conventional means, such as a magnetic stirring bar. The purple colored mixture turns dark brown to black in about five to ten minutes. The reaction is as follows:

The precipitate, which is polyacetylene, may be removed by filtration. The polyacetylene formed by this method includes a range of molecular weights. For example, the polyacetylene precipitate may be filtered by suction through Whatman #2 filter paper in a conventional Buchner funnel. The filtrate dries under vacuum to a fine, dark brown powder. The wash may be further processed through a 0.2 micron Metrical membrane filter (alpha-200), using stainless steel Millipore filtration equipment. The solution clarified in this manner contains low molecular weight polyacetylene (approximately 130–520 mw or 10–40 monomers), catalyst and reductant in the petroleum ether/acetone solvent. The precipitate is high molecular weight polyacetylene (about 2000–4000 mw). The low molecular weight polyacetylene may then be separated from the catalyst-reductant by the addition of water, which precipitates the polymer. This suspension is then allowed to stand in a separator funnel for about two hours as the low molecular weight polyacetylene floats to the surface. The catalyst-reductant may then be withdrawn through the separatory funnel, leaving a low molecular weight polyacetylene layer which may be dried under vacuum. The low molecular weight polyacetylene fraction is yellow to yellow-brown in color and is soluble in acetone.

The next step of dehydrobromination may be performed on both the high and low molecular weight polyacetylene fractions. The preferred batch-type method of this invention preferably employs the Luttinger catalyst at reduced concentrations in a solubilizing medium. This combination inhibits chain length elongation and other factors such as supercoiling of polymer chains which would otherwise lead to an insoluble gel or film formation. The preferred solubilizing medium is acetone/petroleum ether, which is inexpensive, safe and permits product purification upon dilution with distilled water. MI. Kletter et al (Mol. Cryst. Liq. Cryst., 165, 1982) first described the process of dehydrobromination and applied it to freestanding thin films obtained by the Ziegler-Natta catalyst in vacuum. In the batch-type end product modification method of this invention, the high and low molecular weight polyacetylene powder is placed in a container to which is attached a source of bromine, at room or ambient temperature (20° C.). A vacuum line should be attached to the container. When the polyacetylene is exposed to the bromine for about one-half hour, the temperature of the bromine loaded polyacetylene is raised to about 140° C. As the temperature of the bath reaches about 140° C., the color of the polyacetylene changes from yellow or brown to green as hydrobromic acid is evolved. After about onehalf hour, the product is cooled to room temperature. By this method, one hundred percent of the low molecular weight fractions and about sixty percent of the high molecular fractions are soluble in acetone. The resulting bromopolyacetylide has an empirical formula of $(CH_{0.94}Br_{0.06})_x$ as derived from neutron activation and prompt gamma analysis. The reaction is as follows:

The next step in the polyacetylene chain modification is metallization. The bromopolyacetylide from the reaction described above is transferred to a container including a solvent, preferably toluene and sodium or lithium sand. The contents are stirred, argon gas is passed over the mixture and the temperature is raised to about 98° C. with a heating element. On completion of the reaction, the polyacetylide powder is bluish. The toluene may then be decanted and the excess metal powder is removed by reaction with isopropyl alcohol. The alcohol may then be decanted, leaving behind sodium or lithium polyacetylide. On analysis, the bromine of the bromopolyacetylide is quantitatively replaced by either sodium or lithium, yielding $(CH_{0.94}Na_{0.06})_x$ or $(CH_{0.94}Li_{0.06})_x$. Typical reactions are as follows:

Most elements of the periodic table possess metallic properties as measured by their reactivity with halides, such as bromine. The method described above for the preparation of sodium or lithium polyacetylide is, therefore, generally applicable for the preparation of any metallic polyacetylide. The replacement of bromine with other elements having metallic properties will also proceed quantitatively, although at slower rates. Typical reactions are as follows:

Alternatively, it is possible to copolymerize a Grignard reagent, such as zinc Grignard with acetylene, for example, as follows:

Where the Grignard contains a halide ion, it may be subsequently replaced by an aryl or alkyl group.

As described, it may be suitable to modify the end product of this invention in solution. In this method, the concentration of catalyst and reductant are increased to 0.1M, which produces a lower molecular weight polymer upon saturation with acetylene gas, and the polyacetylene settles out as a fine powder in the bottom of the reaction vessel with all other conditions similar to those described above. The acetone supernatant is then decanted and replaced by methanol-HCl (0.01M). The methanol wash is stirred and the container is flushed with nitrogen. Approximately 70 g of polyacetylene is produced per liter of catalyst solution. One to one and one-half liters of wash in 250 ml aliquots are added to remove the red color of cobalt from the polyacetylene suspension and decanted. Finally, the washed polyacetylene is combined with acetone, while stirring in the reaction vessel. One millimeter of liquid bromine was then added and, in about five minutes at room temperature, the polyacetylene suspension goes into solution. The brown color of the suspension changes to a green color in the solution. On bringing the temperature of the solution to about 60° C., the color again changes rapidly to a dark blue, accompanied by the evolution of hydrogen bromide gas. Analysis of the end product, following an evaporation of the acetone, indicates a 2.5% increase in weight or 0.5% dehydrobromination. Neutron activation analysis confirms the microbalance weight increase determination. The bromine incorporated in this manner cannot be removed by methanolic wash, by vacuum drying or heat treatment to 500° C. in the mass spectrometer. The reactions are therefore as shown above.

The polyacetylene is metallized by adding finely powdered metal to the solution. If the metal is sodium or lithium, care must be taken to remove water from the solvents and the new mixture is purged with argon. The temperature is then raised to about 45° C., but not higher than 55° C. The reaction is exothermic and complete within about 15 minutes. The polyacetylene solution is now silver in color with the unreacted powdered metal at the bottom of the vessel. The polyacetylene may then be decanted, leaving the metal behind for washing and storage for later use. One-half volume of petroleum ether which is miscible with acetone is then added to the solution and NaBr precipitates as a white powder. The polyacetylide is again decanted and the powder residue may be discarded. This product may be collected for analysis or storage by evaporation of the acetone. Activation analysis indicates a quantitative replacement of bromine with sodium or lithium. As described, other metal replacements require different temperatures and reaction times for completion. Typical reactions are as described above.

The sodium and lithium adducts of polyacetylide are n-type semiconductors from Hall voltage and thermoelectric power type measurements. The brominated products are p-type. Prepared in the manner described, the metal polyacetylides and bromopolyacetylides are intrinsically doped because the dopants are part of the covalent structure of the polymer as substituted for the hydrogen of $(CH)_x$. These adducts are electrically stable and 60% by weight soluble in acetone and other solvents with similar properties.

Having described the preferred end product modification methods of producing the soluble intrinsically conductive polyacetylides of this invention, the preferred substituted monomer methods will be described. These methods preferably utilize mono or di-iodo, lithium or sodium acetylide as the starting materials. As described hereinbelow, sodium is an excellent leaving group and thus sodium polyacetylide may be preferred in certain applications where it is used as a starting material in crosslinking or other reactions. Lithium and diiodoacetylide and their polyacetylides are more stable in air because lithium and iodine have more stable covalent bonds. Conversely, however, lithium and iodine are not as good leaving groups. If sodium acetylide is used as a starting material, care must be taken to avoid reactions with oxygen.

The methods of making the starting materials are known and several are available commercially. Sodium acetylide, for example, may be purchased from Aldrich Chemical Company in St. Louis, Mo. Diiodoacetylide may be made by reacting acetylene gas in a solution of potassium iodide (KI) with sodium hypochloride (NaOCl), as follows: Water is added slowly to calcium carbide, generating calcium hydroxide and acetylene gas. The acetylene gas generated by this method is conducted into a solution of potassium iodide. A solution of sodium hypochloride is then added slowly, yielding diiodoacetylide as a flocculent precipitate and sodium chloride. The precipitate may then be filtered from the solution, washed with water and dried. Similar methods may be used to produce mono or dilithium acetylide. As will be understood, it is also possible to incorporate intrinsically almost any metal in the acetylide starting material, and therefore the resultant polyacetylide, using Grignard reagents. Typical reactions are as follows:

In the substituted monomer method of this invention, the metallic acetylide is polymerized directly into the polyacetylide. As stated above, the preferred catalyst is cobalt nitrate and the preferred reductant is sodium borohydride. A suitable solvent is acetone. Using acetone as the solvent, a solution of about 40 mM cobalt nitrate and 40 mM sodium borohydride reductant is made. The metallic acetylide is then added to the solution and the reaction proceeds to completion at atmospheric pressures and 193° K. Catalytic efficiencies, based on moles acetylide monomer per mole catalyst, are typically on the order of 15 to one, although higher ratios may be obtained using monomer concentrations greater than 10 g/L and borohydride amounts in excess of 40 mM.

Using this method, it is possible to form soluble intrinsically conductive or semiconductive stable polyacetylides including polyiodoacetylides, polylithium acetylides and polysodium acetylides. As will be understood, if dilithium acetylide is used as the starting material, the resultant polymer will be polydilithium acetylide and if monolithium acetylide is used as the starting material, the resultant polymer will be polymonolithium acetylide. Similarly, iodoacetylide or diiodoacetylide may be used as starting materials. Finally, as described above, other metals may be substituted by using Gringard reagents, as described above.

Verification of the covalent structure of the polyacetylides formed by the methods of this invention may be obtained using infra-red spectroscopy. KBr pellets of vacuum dried samples prepared under argon in a dry box were run in the Perkin Elmer Model 283 spectrometer in a nitrogen environment. Polymonolithium acetylides show the typical 745, 1005 cm$^{-1}$ CH deformation peaks. These peaks are characteristic of trans and cis conformations and are temperature sensitive. CH deformation and C=C bending and stretching vibrations characteristics of vinyl group and conjugated systems also are apparent near 845, 1600 cm$^{-1}$. Similarly, C-Li stretching frequencies between 400–500 cm$^{-1}$ are apparent in these samples in contrast to polyacetylene alone. The polydilithium acetylide and polyiodoacetylide show C-I stretching and C-Li rocking vibrations between 680–700 cm$^{-1}$ and 400–450 cm$^{-1}$, respectively. The strong and characteristic CH deformation was not present in the samples tested. Evidence for C=C characteristic was, however, identifiable at 1650 cm$^{-1}$.

Both the end product modification and substituted monomer methods of this invention produce stable metallic and halogenated polyacetylides. The substituted monomer method has the advantage of insuring that halogens or metals are distributed uniformly in the final polymer. Further, copolymerizing substituted acetylene with either the metallic or halogenated acetylides allows control or the content of electropositive and electronegative groups in the product. Thus, depending upon the degree of hydrogen substitution by metals or halogens, the polymer will be correspondingly n- or p- in the semiconductor range. If the metal or halide content, relative to hydrogen, is greater than 10%, the polyacetylide conducts in the metallic range, i.e., greater than 100 mhos/cm. If the metal or halide content relative to hydrogen is less than 5%, the polyacetylide behaves as a semiconductor. For simplicity, either product may be referred to herein as conductive.

Polyacetylides prepared by the substituted monomer method of this invention are not only uniformly halogenated or metallated, but are correspondingly soluble in polar solvents, such as water or alcohol. The solubility properties may be altered by incorporating benzyl acetylide, benzyl lithium acetylide or benzyl iodoacetylide in the polymer. This product is amphoteric or soluble in both organic and polar solvents. For example, as shown below, the halogenated or metallated acetylide may be copolymerized with acetylene by the method described above, producing a copolymer with conductivity in the semiconductor range. Diiodoacetylide for example, may be copolymerized with acetylene, yielding a copolymer of polyiodoacetylide and polyacetylene. Acetylene gas is conducted into the solvent and reductant as the diiodoacetylide is added yielding the copolymer. As described, the solubility of the polyacetylide in organic and polar solvents may be improved by copolymerization with an aromatic heterocyclic or homocyclic group. For example, benzyl acetylide may be copolymerized with mono or dilithium acetylide or diiodoacetylide and acetylene. The copolymer will be correspondingly n- or p-type in the semiconductor range and soluble in organic and polar solvents, including water. The reactions of the examples above are as follows:

n(I.C≡C.I) + n(H.C≡C.H) ⟶

It is also possible to copolymerize monomers carrying both benzyl and metallic or halide groups for setting conductivity. This metallation, halogenation and thiolation can also be achieved by synthesizing the metallated, halogenated and thiolated monomers, which may then be polymerized themselves or copolymerized with acetylene. Such a reaction can be represented as follows:

A halogen, such as iodine may be substituted for the thiol (SH) group. Similarly, other active aryl, alkyl or allyl groups containing metals, halogens or other polar agents may be attached to the monomer and polymerized using the preferred catalyst and reductant described above.

Soluble metallic or halogenated polyacetylides may be dried from the solvent to a thin conductive film, sprayed or fused from dried powder by heat pressing at about 75° C. and 30,000 psi. Scanning electron microscopy indicates considerable ordering and eliminating of porous voids in this products which undoubtedly accounts for the enhanced conductivity comparable to the recently described highly conductive stretched $(CH)_x$ filaments. Such materials exhibit semiconductor-metallic transition above approximately 5% hydrogen replacement by metal or halogen.

Having described the preferred methods of forming the basic stable soluble halogenated or metallated polyacetylides, it will now be understood that the soluble polyacetylides of this invention may also be used as starting materials for further polymer reactions, opening a new field of polymer chemistry. For example, branching additions to the polyacetylide chain may be intrinsically affixed by reacting sodium or lithium polyacetylide obtained by the methods described hereinabove with straight chain or cyclic monobrominated or monolithiated hydrocarbons. The sodium or lithium acts as a leaving group, taking with it the bromine of the hydrocarbon. This double displacement leaves behind two reactive radicals on the hydrocarbon and polyacetylide, which subsequently combine. The product is a branched polyacetylide. Temperature and pressure conditions are ambient temperature and atmospheric pressure. A 20% excess of the branching hydrocarbon halide relative to sodium or lithium is preferably added to the reaction to assure complete reaction. The branching product is precipitated upon the addition of one volume methanol and the supernatant may be discarded. Residual methanol is removed by evaporation under vacuum. The dried product may be stored at $-40°$ C. in a vacuum desiccator until required for use.

Figure 5:
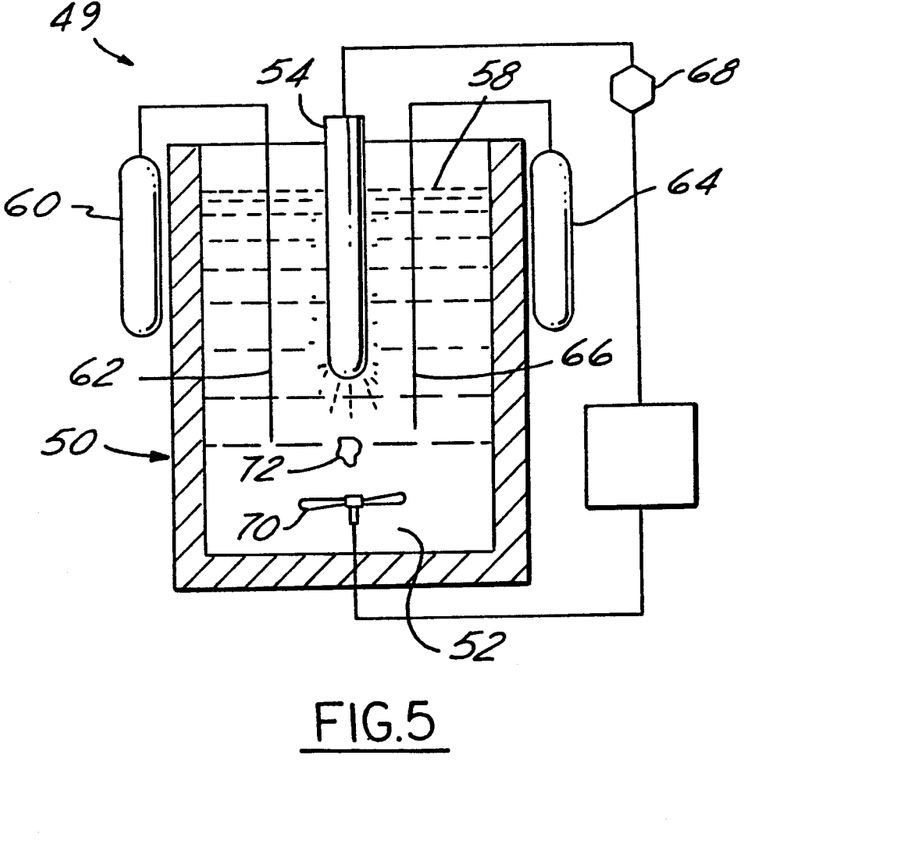
FIG. 5 illustrates diagrammatically a preferred method of making the conductive polymers of the present invention.

For example, sodium or lithium polyacetylide may be reacted with dibromobenzene or difluorobromobenzene in a solvent such as methanol in the presence of a catalyst, yielding bromobenzyl polyacetylide or difluorobenzyl polyacetylide, respectively, plus sodium bromide or lithium bromide. As described, the preferred catalyst is cobalt nitrate in conjunction with sodium borohydride as a reductant. Similarly, sodium or lithium polyacetylide formed by the methods described hereinabove may be reacted with bromopyridine, yielding pyridine polyacetylide. The described reactions are as follows:

Referring now to FIG. 5 of the drawings, the method of forming conductive polymers utilizing both catalyst/reductant initiation and photochemical or ionizing radiation will now be more fully explained. Accordingly, reaction apparatus 49 is shown which comprises a reaction vessel 50 that defines reaction chamber 52. Suspended in chamber 52, ultraviolet light source 54 is seen by which photochemical initiation is achieved. It is to be understood that light source 54 may in some applications may also comprise a visible light source or in another embodiment of the invention, comprise a source of ionizing radiation such as x-rays, or gamma rays or a source of particulate radiation such as neutrons, alpha particles, and beta particles. Also, although light source 54 is shown extending into chamber 52 in this particular configuration, other arrangements may be suitable so long as source 54 is capable of initiation polymerization at an acceptable rate. One preferred ultraviolet light source 54 is a single 600 watt u.v. bulb having a length of about 10 inches and a diameter of about 1 inch. Light source 54 is connected to power source 56.

In the most preferred embodiment of the invention, vessel 50 is filled with an acetone solution (shown as reference number 58) of 40 mM cobalt nitrate and 40 mM sodium borohydride. In the broadest sense, any catalyst systems which acts as a polymerization initiator in the reactant systems of this invention may be suitable as solution 58. The volume of reaction chamber 52 and of solution 58 will vary depending on the scale of reaction apparatus 49.

Acetylene gas tank 60 is provided from which a supply of acetylene gas is bubbled into solution 58 via pipe 62. Holding tank 64 is provided in which an acetylene monomer solution is contained which is pumped into solution 58 through pipe 66 by pump 68. The nature of the monomer will be more fully described hereinafter. In order to assure adequate moving of the reactants, mixer 70 is provided which is also powered by power source 56.

In operation, and in accordance with the method of the present invention, light source 54 is illuminated causing electromagnetic energy to penetrate solution 58. Mixer 70 is then started to produce good mixing, but not at a rate at which excessive foaming occurs. At substantially the same time, the flow of acetyline from tank 60 and the flow of acetylide monomer from tank 64 are initiated. As mixer 70 mixes the reactants and catalyst/reductant, the catalyst/reductant begins to initiate polymerization of the acetylene and acetylide monomers. At the same time, photochemical initiation of the acetylene and acetylide monomers occurs by the ultraviolet radiation. It has been found that by combining these two distinct polymerization initiation methods in forming the conductive polymers of the present invention, a synergism occurs which produces conductive polyacetylides which demonstrate excellent electrical conductivity. The resulting conductive copolymer 72 is shown forming in solution 58.

As with the previous description of polymerization directly from acetylide monomers, in this embodiment suitable acetylide monomers are those described generally herein for the formation of conductive or semiconductive polymers. Particularly preferred are polyiodoacetylides, polylithium acetylides and polysodium acetylides. Where the volume of solution 58 is about one liter, acetylene is preferably introduced at a rate of about 5–10 cc per minute while acetylide monomer is introduced at a rate of about 1 gm per minute. The temperature of solution 58 is preferably maintained at about −60° to −20° C. Mixer 70 circulates the reactants such that the materials are exposed to light source 54. This becomes increasingly important as the concentration of polymer 72 increases since its accumulation tends to block the transmission of light through solution 58. Polymer made utilizing acetylene and lithium acetylide, or iodacteylide as a monomer in accordance with this method demonstrates excellent electrical conductivities.

It will then be understood that intrinsic organic doping of the polyacetylide is possible by reacting a sodium, lithium or possibly iodopolyacetylide with any halogen conjugated ring or straight chain monomers. The resultant conjugated ring or straight chain polyacetylide is soluble in various solvents including methanol and may be used as a conductor, semiconductor, film or paint. The film or paint adheres well on glass, metal or wood surfaces, forming a thin film in the 200 to 600 Å range from scanning electron microscope evidence. Just as ordinary polyacetylenes may be prepared in short (yellow) to long (purple) fibers by regulating the cobalt content or stopping the chain elongation by poisoning the cobalt with hydroxyquinoline, so can the polyacetylides synthesized by these procedures. Thus thin coatings may be prepared which may be metallic or conductive having a strong affinity for glass or metal surfaces and which poses intrinsic colors determined by chain length.

It has further been discovered that high tensile strength structural materials and conductors may be formed by oxidative crosslinking starting with the soluble metallic polyacetylides of this invention and halogen sulfide monomer organic crosslinkers having the general formulation XRSH, wherein X is a halogen, R is an aromatic or aliphatic group, S is sulfur and H is hydrogen. First, the halogen (X) reacts with the metal (Me) bound covalently to the polyacetylene chain (PA) in the following manner: PA-Me+XRSH→PA-RSH+MeX. Second, two separate polyacetylene chains react with one another in the presence of an oxidant to crosslink through the sulfur atoms (disulfide bond), as follows: PA-RSH+HSR-PA→PA-R-S-SR-PA, as follows:

For example, sodium polyacetylide may be reacted with bromothiobenzene, forming thiolbenzyl polyacetylide. The reaction proceeds at standard ambient temperature and atmospheric pressure to the removal of sodium bromide and the addition of thiobenzene to the polyacetylide chain. The thiolbenzyl polyacetylides are then oxidized, wherein adjacent chains with the nearest neighbor thiol groups lose their hydrogens and react with one another, forming dithiol disulfides. These disulfides improve the tensile strength of the polymer by $10^3$ and provide elasticity due to the deformable dihedral angle about the bond.

Oxidation crosslinking as described above may also be accomplished by reacting NaSH with PA-X, wherein X is chlorine, bromine or iodine. For example, PA-X may be polydiiodoacetylide formed by the method described hereinabove. The reaction then proceeds as follows: PA-X+NaSH→PA-SH+NaX. The thiol polyacetylides are then oxidized by the following equation: 2PA-SH+O→PA-SS-PA+H$_2$O. The NaX washes off with water after the polyacetylide has been stabilized through the disulfide linkage. This linkage enhances the conductivity of the polyacetylide by two to three orders of magnitude, presumably through orbital hybridization between sulfur and carbon. It is also possible to adjust the elasticity and tensile strength by adjusting the polydithiol acetylide, as described hereinbelow. The reaction is as follows:

A simpler "vulcanization" crosslinking method has also been discovered, as now described. In this method, dimetal disulfide $Me_2S_2$ is added to a dihalogen polyacetylide $X_2PA_2$ prepared by the methods described above, yielding directly the dithiol disulfide polyacetylide described above. Sodium is an excellent leaving group and therefore disodium disulfide may be used as a starting material. Further, the properties of the resultant polyacetylide may be varied by adding additional sulfur to the crosslinking monomer. The disulfide is stiff giving a crystalline structure to the resultant polyacetylide, as follows: $2XPA + NaS\text{-}SNa \rightarrow PA\text{-}S\text{-}S\text{-}PA + 2NaX$, wherein X is a halogen and PA is polyacetylide, as described above. A typical equation is as follows:

The number of sulfurs may, however, be varied from two to six, yielding the general equation to $2PA\text{-}X + NaS_nNa \rightarrow PA\text{-}S_n\text{-}PA + 2NaX$. A single sulfur may also be added as NaSNa between the polyacetylide (PA) chains. As described above, experimental work does not suggest that the sulfur addition by this method interferes with conductivity. Instead, the sulfur appears to enhance the conductivity. The reason for this appears to be due to successful orbital hybridization between carbon and sulfur, without affecting the conjugated double bond structure of polyacetylide. This is contrasted with vulcanization in rubber, in which elemental sulfur adds chain-to-chain across the isoprenoid units, converting double bonds to single bonds in the process.

Figures 1, 2:
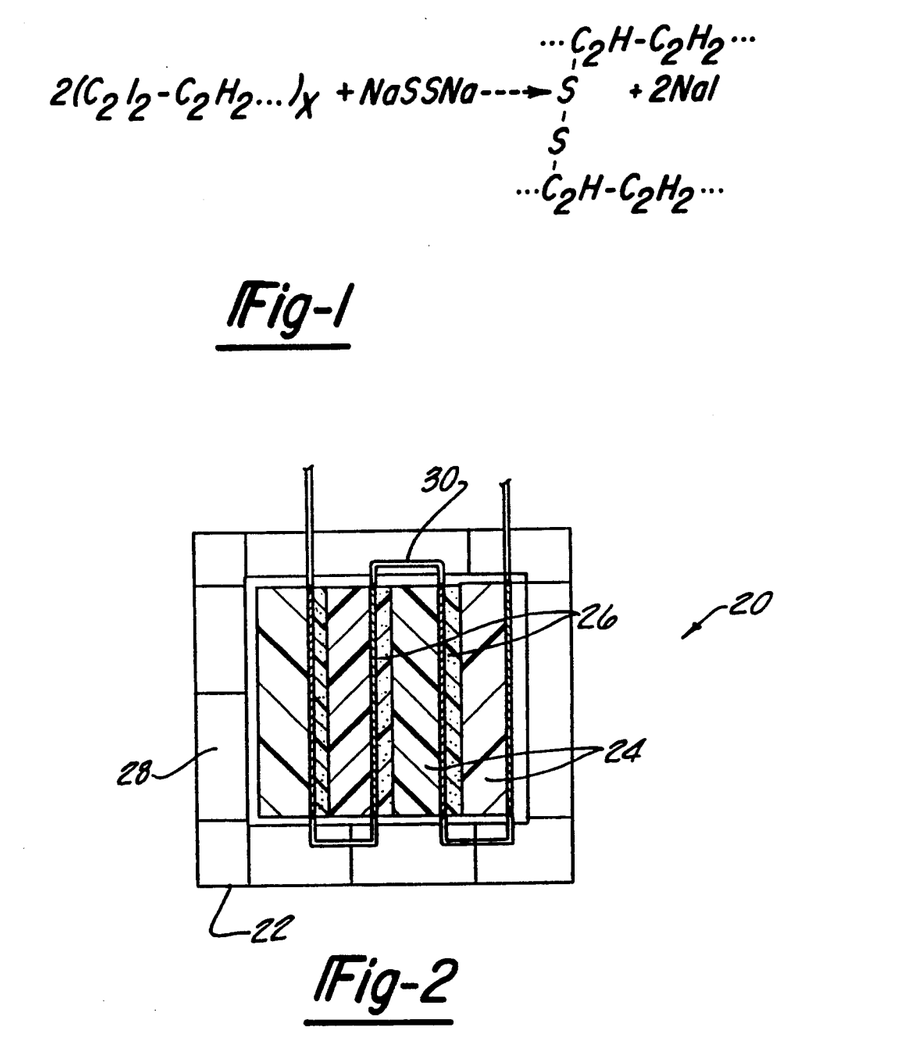
FIG. 1 illustrates a typical crosslinking vulcanization reaction with a polyacetylide of this invention.
FIG. 2 illustrates an organic battery of this invention.

A promising method of vulcanization and simultaneous enhancement of electrical characteristics involves the use of halogenated ethylene or acetylene and metallic polyacetylides or conversely reacting halogenated polyacetylide with metallic polyacetylide by the reactions now described. The general equation for the reaction of a halogenated ethylene with a metallic polyacetylide, may be stated as follows: $X\text{-}CH_2=CH_2\text{-}X + 2PA\text{-}Me \rightarrow PA\text{-}HC=CH\text{-}PA + 2MeX$, wherein X is a halogen, PA is polyacetylide and Me is a metal. The equation for the reaction of an acetylide with a metallic polyacetylide, is as follows: $X\text{-}C\equiv C\text{-}X + 2PA\text{-}Me \rightarrow PA\text{-}C\equiv C\text{-}PA + 2Me\text{-}X$. Finally, the general equation for the reaction of a halogenated polyacetylide with a metallic polyacetylide, is as follows: $2PA\text{-}X + Me\text{-}C\equiv C\text{-}Me \rightarrow PA\text{-}C\equiv C\text{-}PA + 2MeX$. The products of these reactions are not equivalent, since the polyacetylides of the second and third reactions have crosslinking triple bonds, while the first polyacetylide has double bonds. The resultant polyacetylides all include conductive bond structures and are stable. It should be noted that the crosslinking can be closely controlled by knowledge of the extent of halogenation or metallation in the polyacetylide and the concentration of the added ethylene or acetylide monomer. This crosslinking takes advantage of the intrinsic n- or p-polyacetylide dopants, thus making the process more direct and flexible than sulfur-type vulcanization. The products in this case are also highly crystalline. Typical reactions are as follows:

The crosslinking vulcanization reactions described above may be run in acetone, as a suitable solvent. After the reaction is complete, the polyacetylides precipitate. The products should then be filtered, followed by a water wash to remove the excess cross-linker. A simple reaction of the type described is the addition of disodium disulfide and diiodopolyacetylide, as shown in FIG. 1. As stated above, this reaction is somewhat analogous to vulcanization.

The products of these reactions have several applications, including super hard coatings on glass and metallic surfaces and structural materials for use in the transportation and building industries. As understood by those skilled in the art, the weakest plastics are only a factor of ten in tensile strength less than steel on a per unit weight basis. However, the sulfide ethylene and acetylene crosslinks in the crosslinked polyacetylides described above are on the order of $10^3$ stronger than the weak interchain bonds and therefore a polyacetylide film or structural member is comparable to or may exceed steel in tensile strength on both weight and volume bases.

Applications of the crosslinked polyacetylides are, however, not confined to coatings and structural materials. The greatest use is likely to be in conductors and semiconductors in electrical components, transmission lines, shieldings for communication devices and microwave absorption. Further, as described above, substantially any metal may be included in the crosslinked polyacetylide by using a Gringard reagent having the following general formulation: $PhC=C-Me-Br$, wherein Ph is a phenyl group and Me is a metal such as magnesium, aluminum, zinc, iron, copper, silver, germanium, etc. Alternatively, metals may be added by reacting the ammonium salt of the metal with acetylene or phenyl acetylene, yielding metallic acetylide or phenyl metallic acetylide by known reactions, which may then be polymerized as described above. It should also be noted that the resultant crosslinked metallic polyacetylide may be electrocoated with any suitable metal because the polyacetylide may be electrically conductive.

Having described the methods of making the stable conductive or semiconductive polyacetylides of this invention, it will be understood that these materials can be fabricated into basic electrical components used to construct substantially any electrical unit. For example, a diode may be made by overlaying thin n- and p-type semiconductive layers formed by the methods described above which have intrinsic doping with organic or inorganic cations and anions. The overlay of n-type with p-type semiconductive materials constitutes a diode having a conventional I/V curve with a turn-on voltage of 0.2 volts. The lower value suggests faster response and less noise (signal loss) than other alternatives. Similar overlays of n- and p-type materials can be used to form transistors. MOSFETS, GFETS and other transistor families are similarly obtained by overlay. Desirable alpha, beta and gamma values for collector, base, emitter ratios are determined from transistor curve tracers.

Undoped polyacetylene is a natural resistor. Thus, the resistance can be varied over 12 orders of magnitude with anion or cation additions as described above. Polyacetylide made n- and p- by these processes can be used between capacitor plates as dipolar materials with highly resistive thin films of epoxy or undoped polyacetylene sandwiched between them. The value of the capacitance can be set by the percentage of intrinsic dopant added to regulate the charge density. Diodes and field effect transistors of the types described above may also be used as switching components in an IC chip.

IC chips require some or all of the components described above. In addition, there is required metallic art work and a reinforced fiberglass board, plus mechanical pin connectors. These accessory structures and IC chip packages occupy approximately 90% of the space in current electronic devices. It is possible, however, to eliminate the accessory structures through consolidation of all parts in a single package through large scale integrated printing, as described below. Metallic polyacetylide which is heavily intrinsically doped, may be used to replace the bulky connectors and artwork materials now in broad industrial use. The soluble polyacetylides of this invention, whether metallic or semiconductive or highly resistive, may be used as inks. The IC and PC components as described above may then be rolled by platens, silk screened, magnetic or dot matrix printed. The solid components can be polyacetylide ink printed in large quantities at fractions of the cost and time and miniaturized to 10% of the space now required. The polyacetylides of this invention are ideally suited to these applications because of their inherent tensile strength. Normally, such films or junctions must be soldered together. It is possible, however, using crosslinkers with the polyacetylides of this invention to auto seal the junctions. These crosslinkers will restrict internal motion of polyacetylene fibers, preventing cracking and material aging. More importantly, the crosslinkers reduce junctional resistance and improve transport through the transistors.

The metallic and halogenated polyacetylides made by the monomer substitution method of this invention are uniform in their structural and conductive properties. Current data indicates that polyacetylides from the monomer substitution method are extremely good conductors when synthesized with monolithium acetylide or diiodoacetylide.

Thus, the conductive and semiconductive polyacetylides of this invention have particular application for the electronic industry for reducing the cost, weight and size of the electronic components and simplifying the manufacture of various electronic circuits including ICPC components. As described, the electrical properties of the conductive a semiconductive polyacetylides of this invention can be tuned to desirable characteristics for almost any application, including switches, photodiodes, laser diodes, microwave detection, temperature and pressure sensors, magnetic field sensors, molecular memory (EPROM type) devices, capacitors, resistors, transistors and connectors for IC chip fabrication.

Having described the numerous electrical elements and components which may be fabricated with the conductive and semiconductive polyacetylides of this invention, a detailed description of a preferred embodiment of a light-weight, compact rechargeable battery will now be described. The electrodes are formed from intrinsically conductive metallic or organic polyacetylides formed by the methods described hereinabove. The cathodes or positive electrodes are p-type polyacetylides (YPA), wherein the conjugated anion (Y) is an electrophile, preferably a halide or conjugated organic cation formed by the methods described above. The preferred conjugated organic cations incorporate sulfur, as described, and are preferably crosslinked polyacetylides. The anodes are n-type polyacetylides (ZPA) wherein Z is a nucleophile, preferably a metal or a conjugated organic anion.

The electrodes may be formed from the polyacetylide materials described by several alternative methods. For example, the powdered polyacetylide may be heat fused at a temperature of about 75° C. and a pressure of 30,000 psi. Alternatively, the electrodes may be deposited in thin films upon evaporation of the carrier solvent. More preferably, the polyacetylide electrodes may be formed as a crystalline product by crosslinking, as described above. In the first method, the powdered polyacetylide may be heat fused in a die apparatus wherein the die members are heated to the desired temperature. In a typical application forming heat fused polydiiodoacetylide, the polydiiodoacetylide powder formed by the method described above is placed in a die apparatus, such as a conventional plunger-type die assembly capable of generating in excess of 30,000 psi. The container which receives the polydiiodoacetylide powder may be electrically heated, as required, to maintain a temperature of about 75° C. The polydiodoacetylide powder is then compressed at a pressure of approximately 30,000 psi for about 10 minutes. Scanning electron microscopy of the heat fused product reveals a high degree of parallel fibers.

The electrodes may be any shape desired, however, disk-shaped electrodes have been found to be quite suitable. As will be understood, the electrodes must be separated electrically. In the disclosed embodiment, the disks are separated by fiberglass filter disks which provide a suitable electrical separation. Various electrolytes may be utilized, including propylene oxide saturated with lithium perchlorate and the like, wherein the electrolyte includes 5% $LiPF_6$ and 95% polyethylene carbonate.

FIG. 2 illustrates somewhat diagrammatically a polyacetylide battery 20 of this invention. The battery case 22 may be formed of any suitable material, including non-conductive polyacetylides. The electrodes 24 are separated by fiberglass spacers 26. In the disclosed embodiment, baffles 28 are provided which allow circulation of the electrolyte. The contacts in the disclosed embodiment may be attached to the polyacetylide electrodes 24 by first gold coating the back of the electrode as a collector, then fixing a platinum wire 30 to the gold coating at the tip of the electrode by air drying silver solder. The electrodes are then pressed together with the separator and immersed in the electrolyte.

A prototype having two electrodes was constructed and connected to a four volt direct current power source. The battery charged to 3.2 volts in 30 seconds. Performance analyses were done with a Hewlett-Packard digital multimeter where the current and voltage were measured for short circuit discharge. The open circuit voltage was 3.2 volts and the short circuit current was 20 milliamps for a 0.9 $cm^2$ disk. The short-circuit current fell rapidly after ten minutes to 0.2 milliamps, as the battery discharged. The electrodes were charged by passing 1.2 C, which at discharge had released 1.0 C, for a recovery of 83%. Successive short circuit discharges and recharges showed the number of coulombs involved to be identical within experimental error. Power densities were measured to be on the order of 10 KW/kg, uncorrected for weight of electrolyte, solvent, packaging and useful power available. Thus, the power density of the prototype battery described was more than 20 fold higher than common types of batteries.

It is believed that the extremely rapid charging of the battery described is a result of the low initial resistance porosity of the electrodes. Other advantages were the efficiency of the battery in its energy recovery cycle and the apparent perfect reversibility. Other advantages are the substantial reduction in size and weight for the same voltage. Structural material and electrode contacts may also be made from polyacetylides to improve the power density advantage significantly, such that a typical lead storage battery weighing approximately 20 pounds may be replaced with a polyacetylide battery weighing approximately ½ pound. Based upon the efficiency and storage weight of the battery described, it is anticipated that the battery of this invention will be particularly useful for electric vehicles and the batteries may be coupled for increased power output for solar heating cells and the like.

Figure 3:
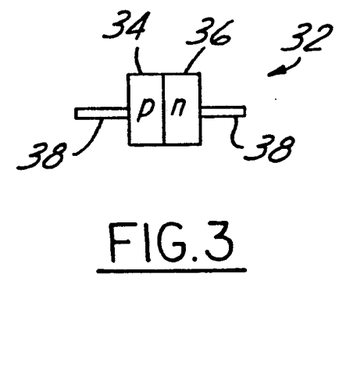
FIGS. 3 and 4 are diagrammatic views of solid state current control devices of the present invention.

As previously mentioned, the stable conductive and semiconductive polyacetylides described above can be employed to fabricate basic electrical components used, for example, in various types of microelectronic assemblies, such as integrated circuits. As shown in FIG. 3, a diode 32 may be formed of two contiguous interfacing layers 34, 36 of intrinsically doped soluble conductive polyacetylide respectively of p- and n- conductivity types. The doping may be with organic or inorganic cations and anions. The diode 32 exhibits a conventional current-voltage curve having an extremely low turn-on voltage. The layers 34 and 36 may be connected in an electric circuit, as in an integrated circuit chip, by means of conductive leads 38 which may consist of, polymerized metallic polyacetylide.

Figure 4:
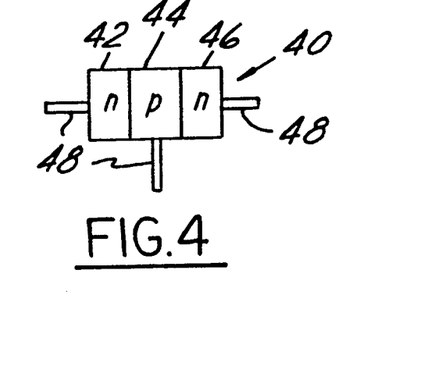

As shown in FIG. 4, a transistor-like device 40 may be formed of three, contiguous, interfacing layers 42, 44, 46 of semiconductor material and of alternating conductivity type respectively forming an emitter, base and collector. One or more of the layers 42–46 is formed of an intrinsically doped stable semiconductive polyacetylide formed in accordance with the present invention. The leads 48 which respectively connect the emitter, base and collector layers 42–46 with an incorporating circuit, may be formed of metallic polyacetylide as described above.

Having described the intrinsically conductive and semiconductive polyacetylides of this invention, the preferred methods of forming the polyacetylides, including methods of crosslinking, and several applications for the polyacetylides, it will be understood that further modifications may be made to the polyacetylides, methods of manufacture and applications within the purview of the appended claims. The fact that the polyacetylides of this invention are stable, soluble and intrinsically conductive opens new fields of polymer chemistry and electronic design. It is not possible to define all of the polymers which may be formed using the polyacetylides of this invention as a starting material or the numerous applications for the polyacetylides in the coating, electrical and structural fields.

What is claimed is:

1. An ultraviolet light absorbant and infrared radiation reflective intrinsically conductive coating for transparent and semitransparent materials including glass and ceramics, comprising an intrinsically doped alkali metal polyacetylide solution in an organic solvent carrier.

* * * * *